United States Patent

[15] 3,689,930

Strickland

[45] Sept. 5, 1972

[54] OPINION SAMPLING APPARATUS

[72] Inventor: Robert E. Strickland, 1965 S. Beverly Glen Blvd., West Los Angeles, Calif. 90025

[22] Filed: Dec. 9, 1970

[21] Appl. No.: 96,410

[52] U.S. Cl. ...................... 346/1, 35/8 R, 40/28 R, 346/37, 346/51, 353/122
[51] Int. Cl. ...................................................... G01d
[58] Field of Search........346/1, 17, 37, 51, 33 A, 79; 35/48 R, 9 A, 8 R; 40/28 R, 28.1, 28.3, 52; 353/15, 121, 16, 122, 18, 19; 179/100.1 C; 340/309.5, 322

[56] References Cited

UNITED STATES PATENTS

| | | | |
|---|---|---|---|
| 2,152,296 | 3/1939 | Weis et al. | 40/28.3 |
| 2,733,923 | 2/1956 | Sterner et al. | 40/52 R X |
| 3,177,767 | 4/1965 | Templeman | 353/15 |
| 3,255,536 | 6/1966 | Livingston | 35/48 X |
| 3,590,497 | 4/1969 | Darby | 35/9 |

*Primary Examiner*—Joseph W. Hartary
*Attorney*—Christie, Parker & Hale

[57] ABSTRACT

Apparatus and method are provided for obtaining public opinion data or the like from a sample of the public. The apparatus has a console on which an inquiry is projected by a slide projector and a plurality of push buttons by which a person may respond to the questions asked. Pressing one of the push buttons causes a tape punch to record the answer to the question, and also causes the slide projector to advance to the next slide in a predetermined sequence. If no answer is received in a selected time interval, means are provided for cycling the slide projector to the beginning of a sequence. In a preferred embodiment, a circular tray projector is employed, with switches actuated by cams on the tray initiating various functions.

18 Claims, 6 Drawing Figures

PATENTED SEP 5 1972

FIG_6

FIG_4

INVENTOR.
ROBERT E. STRICKLAND

BY

Christie, Parker & Hale
ATTORNEYS

OPINION SAMPLING APPARATUS

BACKGROUND

Many industries providing services or products to the public desire a response from the public with respect to the services or products that they receive. Surveys of customer characteristics and opinions concerning the goods or services have been conducted, principally by some form of personal interview or written questionnaire. A personal interview by a well trained interviewer is nearly optimum for obtaining opinion or personal data type surveys; however, the cost per unit data obtained is quite high and usually beyond the reach of many organizations.

A mailed questionnaire can be employed for obtaining opinions; however, the percentage of returns is usually very low and if any substantial number of questions are asked of a reasonable size sample of people, the cost of transposing and tabulating the written data obtained, even for automatic data processing, is relatively high.

It is, therefore, desirable to obtain public opinion and personal data type information of a selected sample of the public without undue expense.

BRIEF SUMMARY OF THE INVENTION

Therefore, there is provided in practice of this invention according to a presently preferred embodiment an opinion sampling apparatus having means for displaying a multiple choice inquiry, means for indicating an answer to an inquiry independent of identification of the answeror, means for recording the answers given, and means for sequentially proceeding through a sequence of inquiries. Means for recycling to the beginning of the sequence may be initiated when no answer is received during a selected time interval.

DRAWINGS

These and other features and advantages of this invention will be appreciated as the same becomes better understood by reference to the following detailed description of a presently preferred embodiment when considered in connection with the accompanying drawings wherein.

Throughout the drawings like numerals refer to like parts.

DESCRIPTION

Figures 1, 2:
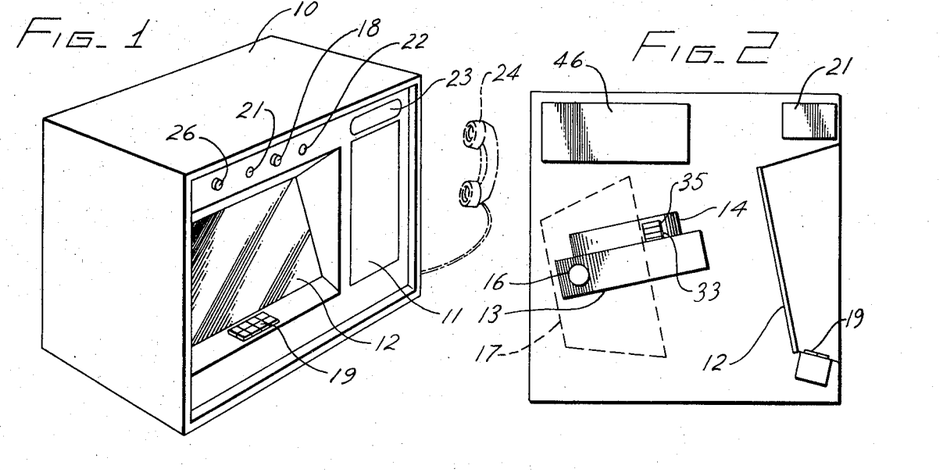
FIG. 1 illustrates in perspective an opinion sampling apparatus constructed according to principles of this invention.
FIG. 2 is a semi-schematic cross section through the apparatus of FIG. 1.

FIG. 1 illustrates in perspective an opinion sampling apparatus constructed according to principles of this invention. As illustrated in this embodiment, the apparatus is mounted in a cabinet 10 which may be placed on a counter, fastened on a wall, or mounted on a suitable pedestal or stand, as may be desired for a particular application. Preferably, such an apparatus is employed in a location accessible to the public and having a relatively large traffic so that a relatively large size sample can be obtained. A particularly desirable location is, for example, an airline terminal where a large number of people have access to the apparatus, and where opinions and personal data concerning the travelers is of significant value. Many other locations are, of course, of considerable merit, such as, for example, hotel lobbies, restaurants, markets, museums, public malls, transportation facilities, private clubs, and the like.

An advantage of the apparatus is that it can be put into place in such a location and remain for any desired interval so that the size of sample obtained can be regulated, and the same machine, which is portable, can be employed in a variety of locations for a variety of surveys. The inquiries made by the survey apparatus can be quickly and readily varied for different types of surveys and different locations as may be desired. The data obtained is recorded directly in machine readable format so that there is no expense of manually translating the data received.

On the front console of the opinion sampling apparatus an illuminated display region 11 may be provided inviting passersby to submit data to the machine or permit it to sample their opinions. The illuminated panel 11 may also be used for conveying machine operating instructions, if desired. Such instructions and invitations may also be displayed on a back illuminated translucent screen 12 clearly visible from the front of the apparatus.

As best seen in the transverse semi-schematic cross section of FIG. 2, the screen 12 is illuminated from inside the apparatus by a conventional circular tray projection 13, such as, for example, a Kodak Carousel Model E, or the like. In such a projector, conventional slide transparencies are mounted in a circular tray 14 atop the projector. As the projector is operated, the slides from the tray are sequentially illuminated and projected onto the screen 12. Preferably, in order to minimize the size of the apparatus, a "folded" light path is employed wherein the projector is placed with its projection lens 16 pointed towards a mirror 17, suitably located for bouncing the projected beam onto the screen 12 without distortion. If desired a film strip projector or other suitable device can be employed in lieu of the circular tray slide projector.

Referring again to FIG. 1, the instructions on the panel 11 or screen 12 instruct a person desiring to use the apparatus to press a start button 18 on the front panel. As described in greater detail hereinafter, pressing the start button 18 commences a cycle of operation that continues until an entire sequence of questions has been asked, or, if the person fails to respond within a selected time interval or abandons the machine, the apparatus may recycle to the beginning of the sequence of questions. The inquiries made of the person using the apparatus are projected on the screen 12 and the person responds to the inquiry by pressing one or more of a plurality of push buttons 19 mounted on the front console of the cabinet 10. As soon as a response is given by pressing one of the push buttons 19, a new inquiry is projected on the screen 12, and so on through a preselected sequence of inquiries with each inquiry independent of the answer to any preceding inquiry.

It is to be noted that the response of the person to the apparatus involves only answers to the inquiries presented, and does not involve identification of the person to the apparatus. Thus, the survey taken is anonymous. The survey may include inquiries concerning the opinion of the person using the apparatus, and may also inquire as to some aspects of his personal data in order to correlate this with opinions given. Thus, for example, it may be desired to know the age range, sex, marital status, or other personal data concerning the individual that may provide useful correlations with other data obtained. An optional feature may be incorporated in the apparatus for verification of the data obtained. This may be in the form of a single frame camera 21 mounted on the front of the cabinet 10 for photographing the person taking the survey. Illumination of the person is obtained from the displayed image on the screen 12. The camera may also photograph the dial of a counter for correlation with the set of data obtained. Although conceivably such photographs could be used for identification, they serve instead merely for verification that the data obtained is probably accurate.

A difficulty with surveys taken by anything other than a personal interview is that the person taking the survey may deliberately insert false data, or the machine may be tampered with by juveniles. Many such inaccurate sets of data can be eliminated from tabulation merely by noting consistent anomalies such as unusual patterns of answers, inconsistent answers, or the like. A photograph of the individual using the apparatus can be correlated with a particular data set for enhancing the probability of accuracy of data obtained.

Another optional feature that may be employed with the opinion sampling apparatus comprises a microphone 22 and a speaker 23 so that verbal responses to inquiries can be made, or instructions may be given and inquiries asked by means of recorded messages. Generally speaking, the additional data obtained by such techniques are not of sufficient value to justify the cost of converting the data obtained to machine readable form. If desired, a similar function can be performed by means of a conventional telephone hand set 24 connected to the apparatus and affording somewhat greater privacy than the microphone and speaker. A start lamp 26, indicating to a potential user that a survey may be commenced, may also be provided on the front console or may be combined with the start button 18 to provide internal illumination thereof.

Figure 3:
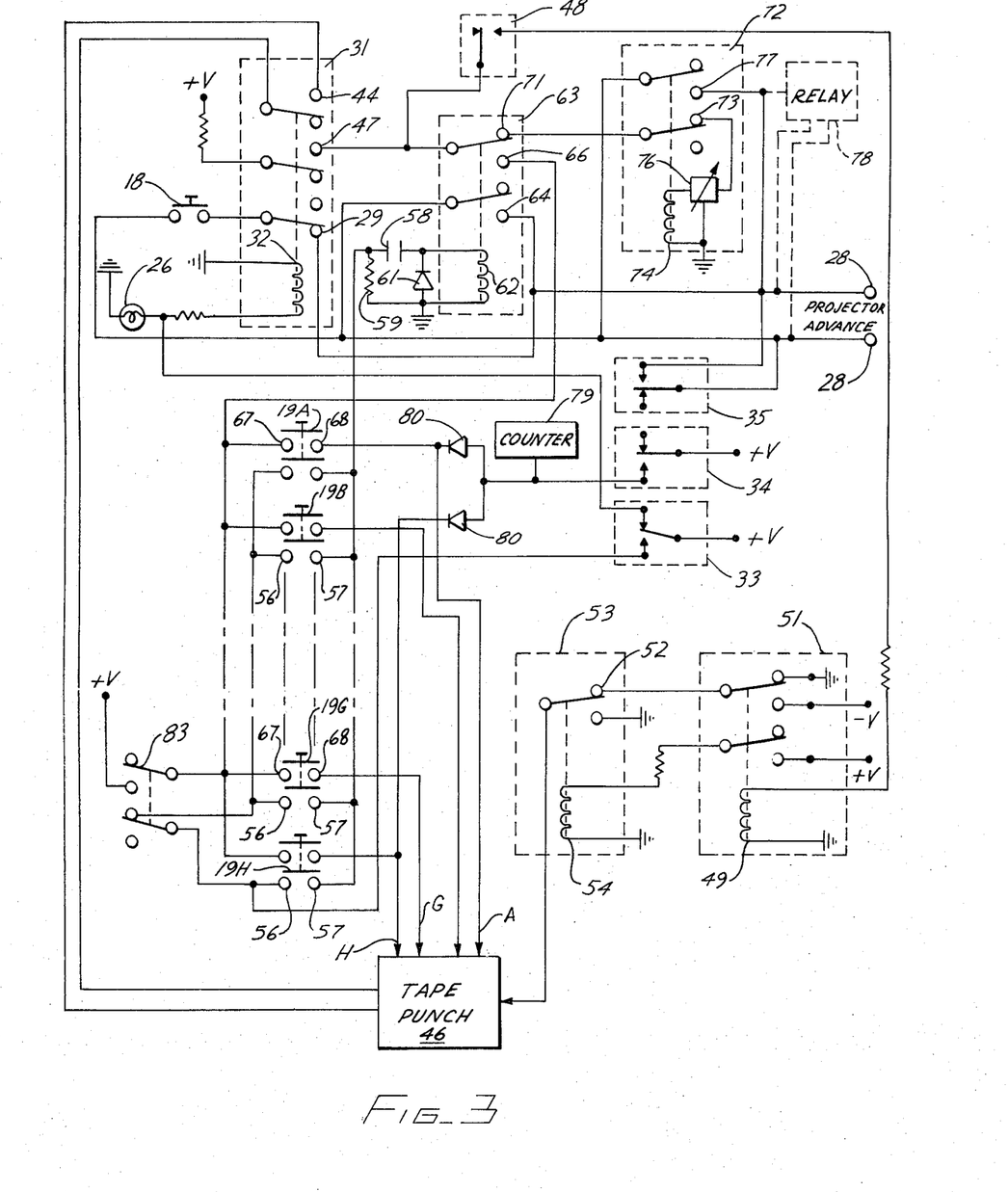
FIG. 3 is a circuit diagram of the apparatus of FIG. 1.

Referring now to FIG. 3, the electrical elements required for operating the projector 13 are set forth in circuit form. Various relays and switches are shown in positions normal for standby of the apparatus before a survey starts.

A pair of terminals 28 are provided for connection to the projector advance mechanism (not shown) which is a conventional portion of the projector having a circular tray. The projector is caused to advance by a switch closure external to the projector. One of the projector advance terminals 28 is connected to the start push button 18, and the other is connected to a contact 29 of a relay 31. Thus, when the start button 18 is depressed by a person using the apparatus, the projector is caused to advance. The relay 31 is held in a closed position by power applied to its coil 32 from a cam operated switch 33. The cam operated switch 33 is one of a plurality of similar switches mounted on the frame of the projector 13 adjacent the drum or slide tray 14 (FIG. 2). In the embodiment illustrated in FIG. 3, three such cam operated switches 33, 34, and 35 are mounted adjacent the drum for actuation thereby. In order to actuate the cam operated switches, a plurality of raised studs are provided on the outside cylindrical surface of the tray or drum in which the projector slides are mounted.

Figure 4:
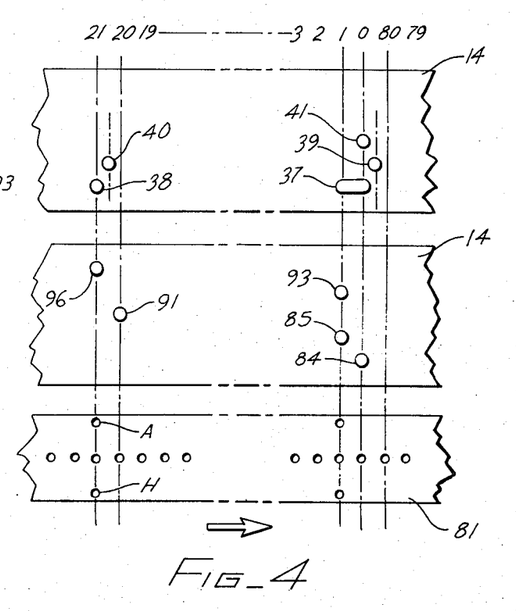
FIG. 4 shows schematically timing features of the opinion sampling apparatus.

FIG. 4 illustrates schematically a portion of the cylindrical surface of the drum 14 employed with a circuit as illustrated in FIG. 3. A raised stud 37 is provided on the tray surface extending from space 0 through space 1 of the spaces in which slides may be mounted in the tray. A circular tray for one popular slide projector has 81 slide receiving spaces therein, which may be numbered from 0 through 80. (Other numbers, such as 140, are also available.) A portion of these slide receiving spaces are indicated schematically in FIG. 4. Although the stud 37 is illustrated spanning the positions 0 and 1 in the tray, it will be apparent that this designation is employed for indicating the slide positions corresponding to the effective position of the stud 37. This stud may be actually located at some other physical position on the tray for operating the switch 33 when the slide tray is in position with the slide receiving spaces 0 and 1 adjacent the projection gate.

Thus, when the slide tray is positioned so that slide No. 1 is projected, the stud 37 actuates the cam operated switch 33. A second stud 38 on the slide tray at slide position 21 is also aligned with the switch 33 so that when the tray is in slide position 21 the switch 33 is actuated. A stud 39 on the tray halfway between slide positions 80 and 0 is aligned for actuating the cam operated switch 34 when the tray is in that position. A similar stud 40 between slide positions 20 and 21 on the tray also actuates the second cam operated switch 34. Another stud 41 is provided at slide position 0 for operating the third cam operated switch 35 when the slide tray is in that position.

Referring again to FIG. 3, when the slide tray on the projector is in position 1 the cam operated switch 33 has closed to provide a voltage signal to the coil 32 of the relay, and also to start light 26 mounted in the start button 18 indicating that the apparatus is ready to be operated. It will be noted that FIG. 3 has various switch and relay closures in the position found when the slide tray is in position 1 ready for operation. When in this position, the slide projector would typically project a promotional slide on the screen inviting a person to use the opinion sampling apparatus. If desired, an instructional slide telling the person how to use the apparatus may be employed.

When a person pushes the start button 18, a circuit is completed to the projector advance terminals 28, thereby causing the projector to advance, say for example, from slide position 1 to slide position 2. This not only projects a new slide on the screen of the apparatus but also operates the cam operated switch 33 to remove power from the coil 32 of the relay 31, and also from the start light 26. This causes the relay 31 to open, thereby opening the contact 29 and preventing projector advance in response to additional operation of the start button 18. Opening of the relay 31 also closes a contact 44 thereby applying power to a conventional tape punch unit 46. The tape punch unit 46 is mounted in the same apparatus as the projector (FIG. 2), and is a conventional unit that perforates a paper tape at a coded location in response to input signals. This produces a conventional paper tape which can be employed directly as a computer input after data has been obtained. If desired, a card punching unit for perforating computer input cards can be employed in lieu of the tape punch unit 46. It will be apparent, of course, that magnetic data storage or the like may be employed, if desired, or the data can be transmitted by telephone line directly to a central computer serving several opinion sampling devices for data processing and storage. If desired the data can merely be stored on counters for recording the total number of responses, however, this sacrifices the ability to cross correlate data. Such an arrangement could be employed for voting, for example.

Opening of the relay 31 also closes a contact 47 for supplying power to a cam operated switch 48. The cam operated switch 48 is mounted on the projector so as to be actuated by the slide changing mechanism (not shown). Thus, each time the projector advances and a new slide is inserted for projection, the switch 48 is actuated once. Closing of the cam operated switch 48 applies power to the coil 49 of a relay 51. Closing of the cam operated switch 48 applies power to the coil 49 of a relay 51. Closing of the relay 51 applies power to the tape punch 46 by way of a contact 52 in a second relay 53.

Closure of the first relay 51 also applies power to the coil 54 of the second relay 53, which is thereby actuated causing the contact 52 to open. The combination of the two relays 51 and 53 thereby applies a short pulse of about 8 milliseconds to the tape punch 46 to thereby cause the tape punch to advance one space in its operation. Other time intervals can be used as required for particular recording devices. It will be apparent to one skilled in the art that the combination of relays 51 and 53 is but one way of providing a tape punch advance pulse to the tape punch 46. The relays 51 and 53 serve the additional purpose of preventing advance of the tape punch more than one space if an operator should press a button during the slide changing operation. This is effective since the cam operated switch 48 is maintained closed substantially throughout the slide changing operation, thereby continually maintaining the relay 51 and hence relay 53 in a position where no pulse can reach the tape punch 46. Preferably, this is accomplished by locating the cam operated switch 48 in a position to be actuated by a slide lifting lever in the projector.

When the slide tray moves off of position 1, the cam operated switch 33 is no longer actuated and power is thereby applied to one contact 56 of each of the response push buttons 19. In a preferred embodiment, eight such response push buttons 19A through 19H are employed in the apparatus for recording responses to multiple choice inquiries. A contact 57 on each of the push buttons 19 is connected to a capacitor 58 and also to ground through a resistor 59. The other side of the capacitor 58 is connected to ground through a diode 61 and is also connected to the coil 62 of a relay 63. The input network to the coil 62 causes momentary closure of the relay 63, typically, for about 10 milliseconds which is sufficient to initiate projector advance, whenever a pushbutton 19 is depressed. The resistor 59 drains the capacitor 58 when the response push button 19 is released. The brief closure of the relay 63 closes a contact 64 connected to the projector advance terminals 28 for effecting advance to the next slide.

Closure of the relay 63 also applies power to a contact 66 that is connected to respective contacts 67 on the response push buttons 19. The corresponding contact 68 on each of the response push buttons 19A, 19B...19H is separately connected to the tape punch 46 for providing an input signal thereto indicating the code to be punched on the paper tape.

Thus, in a cycle of operation, a slide having an inquiry is projected on the screen and the operator may, for example, in response to this inquiry, push response push button 19G. This closes its contacts 56 and 57 and also its contacts 67 and 68. Closure of the former set of contacts activates the coil 62 of the relay 63, thereby momentarily closing the contact 66 for about 10 milliseconds. This applies a 10 millisecond pulse through the contacts 67 and 68 on push button 19G for application to the tape punch 46 which thereupon records that the answer to that inquiry was response G.

Power applied to the cam operated switch 48 by the starting relay 31 is also applied to a contact 71 in the relay 63 when it is not actuated. This applies power to a conventional time delay relay 72 through one of its contacts 73. This power is applied to the coil 74 of the time delay relay 72 by way of a conventional adjustable time delay 76, which is preferably in the range of up to 60 seconds, and it is found that for most surveys a time delay setting of about 15 to 20 seconds is near optimum. Thus, so long as the relay 63 is not actuated by operation of one of the push buttons 19, power is continuously applied to the time delay relay 72. Because of the adjustable time delay 76, this relay does not close until the selected time interval has elapsed. Closure of the relay 63 by operation of one of the push buttons 19 opens the contact 63 and breaks power to the time delay relay, thereby restarting running of the time interval. If on the other hand, a person operating the opinion sampling apparatus fails to push a push button 19 in response to an inquiry within the selected time interval, the time delay relay 72 closes, thereby closing a contact 77 connected to the projector advance terminal 28 thereby causing the projector to advance to the next slide.

Thus, once the start button 18 is depressed and the survey cycle commenced, a projector will advance through its full cycle with each slide being successively projected as soon as one of the push buttons 19 is depressed. In case of failure to depress a push button 19 within the selected time interval the time delay relay 72 causes the slides to progress through the entire sequence. If desired, a conventional latching relay 78, shown in phantom, can be connected to the contact 77 and the projector advance terminals 28 so that once an operator has failed to respond to a projected slide the projector advances through the entire sequence rapidly without projecting each slide for the selected time interval, thereby returning the opinion sampling apparatus to its starting position ready to take another sample in a much shorter time interval. This preempting feature returning the apparatus to its starting condition in case an operator fails to respond is of value when a person initiates a survey and fails to complete it, such as, for example, by losing interest or by being called away for some reason.

Other means may be employed for sensing when a person has abandoned the machine for terminating a survey. Thus, for a few examples, the person may stand on a pressure responsive area while answering a survey; a photodetector may be used to sense the person; or a capacitance proximity detector may show that the person has left the apparatus. Other means may be used for sensing when a person indicates an intent not to complete the survey. Two such sensors can be used if desired for minimizing false alarms when the person's acts erroneously suggest an intent to end a survey.

It is found that sufficient information can ordinarily be obtained in a survey of about 20 questions, and if longer surveys are employed, the person may lose interest before completing the entire survey. Twenty is also a convenient survey length since the typical circular slide tray accommodates 81 slides and four sets of 20 slides substantially fills the slide tray. Typically, the 20th slide in the survey announces the end of the survey and thanks the person for submitting information. When the projector advances from slide position 20 to slide position 21 as illustrated in FIG. 4, the stud 40 between these positions momentarily closes the cam operated switch 34, thereby applying power to a counter 79 counting the number of completed surveys, and also applies power through diodes 80 to both lines A and H leading to the tape punch 46. Closure of switch 48 occurs before the slide tray moves and therefore the tape punch has already advanced one space. The signal on lines A & H causes the tape punch 46 to punch holes in both the A and H spaces on a paper tape 81, as illustrated in FIG. 4. In any other tape position holes appear in only one of the positions A through H in response to depressing one of the push buttons 19. At the end of a test sequence, however, a pair of holes A and H appear in the tape thereby signaling the end of one survey and the beginning of the next. Other end of survey indicia may be used as desired. When the projector advances to slide position 21 stud 38 actuates cam operated switch 33. This removes power from the push buttons 19 and reapplies power to close the relay 31. This pens contact 44 turning off the tape punch 46 to minimize wear. It also opens contact 47 and closes contact 29 so that projector advance occurs only in response to operation of the start button 18 and not in response to any push buttons 19. The apparatus is then on standby to commence the next survey.

As mentioned hereinabove, 20 slides provide nearly an optimum survey length and, in an exemplary embodiment, the slide tray has 81 slide receiving slots. The stud 37 spans slide spaces 0 and 1, and the stud 41 is provided at space 0 on the slide tray. This stud 41 actuates cam operated switch 35 connected to the projector advance terminal 28 so that when the slide tray reaches position 0 the projector is automatically advanced one space, thereby skipping this space in the sequence and yielding a total of 80 usable slide locations in a sequence. Although 20 is a convenient survey length, it will be apparent that this is but one factor of 80 that may be employed, and test surveys of 2, 4, 5, 10, 16, 20, 40 or 80 slides can be employed as desired since each of these is a factor of 80. Similarly, by not skipping space 0, slide sequences of 3, 9, 27, and 81 can be obtained with a conventional slide tray. By providing other arrangements of studs for actuating switch 35, and skipping additional spaces, other effective numbers of slides may be provided in the slide tray for providing surveys of other convenient lengths. It will be noted that closure of switch 35 effects projector advance without advancing the tape punch 46, thereby maintaining the punched responses on the paper tape in synchronism with the sequence of projected slides. Advance of the projector in response to the time delay relay 72 also occurs without advancing the tape punch. The signal applied by switch 34 between the end of one survey and the beginning of the next maintains the tape punch marks in synchronism with the slides projected.

In some surveys it may be desirable to obtain a plurality of answers to each inquiry projected on the screen, and for this purpose a double pole switch 83 is provided. When the switch 83 is in the position illustrated in FIG. 3, the terminals 56 of all of the push buttons 19 are interconnected so that pushing any of the response push buttons results in advancing of the projector and the tape punch. When the switch 83 is thrown to the opposite position, the terminals 56 on the push buttons 19A through 19G are disconnected, and the terminal 56 on push button 19H is the only one to which power is applied. Thus, in order to obtain projector advance and advance of the tape punch, it is necessary to press push button 19H. Closing of the switch 83 into the position opposite to that shown in FIG. 3 applies a voltage to all of the terminals 67 on the push buttons 19 so that pushing of any of the push buttons activates the respective signal line to the tape punch 46.

When used in this mode, a person using the apparatus may push any or all of the push buttons 19A through 19G, and when each is pushed the corresponding hole is punched in the tape. When the person has pressed each of the push buttons 19 needed to answer the projected inquiry, he then presses push button 19H, which for this mode is appropriately marked as providing for transition to the next slide, and the projector and tape punch both progress to the next location. It will be apparent that if desired a time delay relay or other pulser can be put in the line from the switch 83 to the contacts 67 so that only a momentary pulse is applied to the tape punch when any push button 19 is closed.

Figure 5:
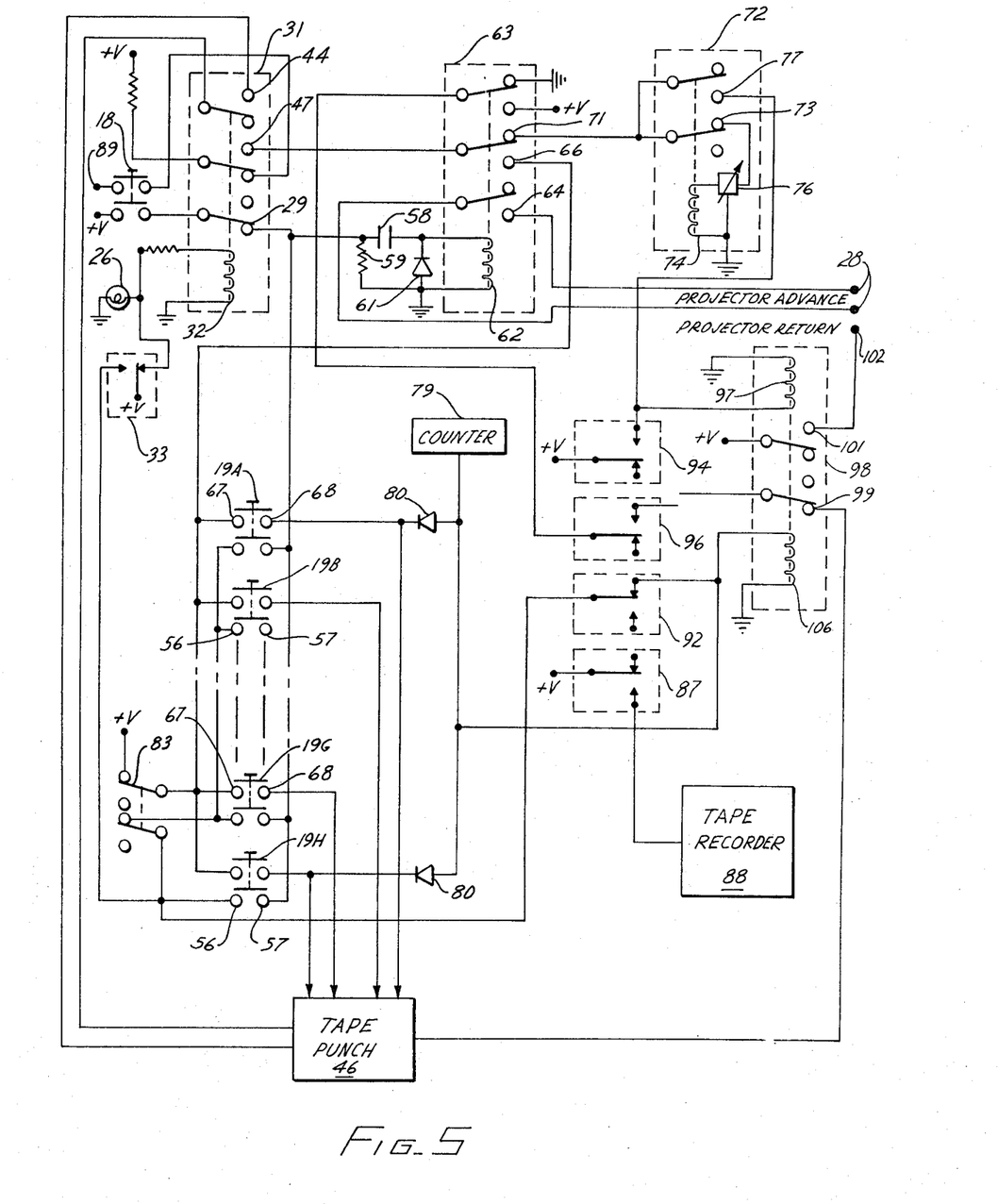
FIG. 5 is an alternative circuit diagram for an opinion sampling apparatus.

FIG. 5 illustrates another embodiment of circuit for an opinion sampling apparatus constructed according to principles of this invention. This arrangement provides some additional flexibility in operation of the slide projector, permitting surveys of any arbitrary length up to the slide tray capacity to be conducted. In the arrangement illustrated in FIG. 3, most or all of the slide slots in the projector tray are filled, thereby requiring several complete sets of slides. Thus, in a preferred arrangement, 20 slides are employed in a survey and four sets of 20 slides must be provided in the projector tray before it travels a full revolution. The embodiment illustrated in FIG. 5 provides a means for avoiding the additional expense of having several identical sets of slides since it permits the slide tray to be returned to its starting position by reversing direction of travel rather than requiring a complete revolution of the tray.

Insofar as the components of the circuit of FIG. 5 are similar to the same elements in the circuit of FIG. 3, they are identified by the same reference numerals, and some of the description of the elements and their functions is omitted in this embodiment since identical to the embodiment of FIG. 3. The embodiment illustrated in FIG. 5 is also shown with the various contacts and switches in a position ready to start a sequence of slides. Thus for just one example, the switch 33 is in a position that activates the coil 32 of the relay 31 so that pressing the start button 18 causes projector advance by applying power to coil 62 of relay 63. A slight difference in the mode of operation upon pushing the start button 18 is to be noted. In the embodiment illustrated in FIG. 3, the start push button is directly coupled to the projector advance terminals 28 so that pressing the start button advances the projector. In the embodiment illustrated in FIG. 5, pressing the start button 18 applies power to the coil 62 of the relay 63 which closes for a few milliseconds, thereby effecting projector advance.

In this embodiment four cam operated switches are provided for operation by the slide tray, and a different pattern of studs on the slide tray is provided, as illustrated in FIG. 4. In this arrangement, the slide tray 14' has a stud 85 in the number 1 slide position for actuating the start switch 33. A stud 91 at the 20 slide position actuates a second cam operated switch 87 connected to a tape recorder 88. This involves an optional feature, which may or may not be implemented in a selected embodiment, as desired. When the tape recorder 88 is actuated by closure of the switch 87, an audible message may be transmitted to a person using the opinion sampling apparatus, and the recorder may also be available for receiving a verbal message from him in response to either an audible or visual inquiry.

Another optional feature is provided in conjunction with the start push button 18, which in this embodiment is a double pole switch for applying power to a terminal 89 (FIG. 5). The camera 21 may be connected to the terminal 89 for taking a single frame photograph of the person operating the opinion sampling apparatus, as hereinabove mentioned.

Referring again to FIG. 4, another stud 96 is provided on a slide tray for actuating a switch 94 (FIG. 5) when slide 21 is reached. A fifth stud 93 is also provided on the slide tray for actuating a cam operated switch 92. Another cam operated switch 96 is provided on the projector for actuation by the slide lifting mechanism for causing the tape punch 46 to advance each time the projector advances. Thus, by operating the tape punch 46 in response to projector operation, the indicia punched on the paper tape are kept in synchronism with the slides projected.

Operation of the opinion sampling apparatus, as illustrated in the schematic of FIG. 5, is substantially the same as operation of the embodiment illustrated in FIG. 3 during a normal situation where the person answers each question in the survey within the time limit set by the time adjust 76 of the time delay relay 72. A difference arises, however, in the situation where a question is not answered within that time limit, whereupon delay relay 72 closes, thereby applying power to contact 77. This applies power to the latching coil 97 of a conventional latching relay 98. Closure of this latching relay opens contact 99, thereby preventing advance of the tape punch 46. It also applies power to contact 101 which is connected to a projector return terminal 102.

Figure 6:
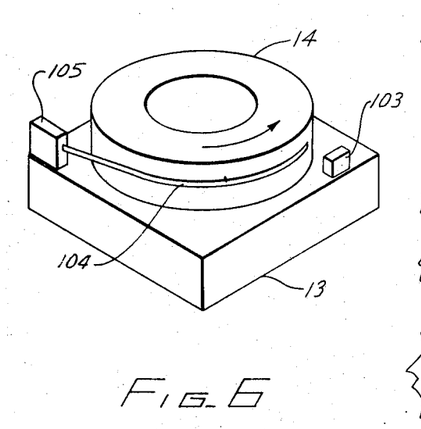
FIG. 6 illustrates a projector return mechanism for an opinion sampling apparatus.

FIG. 6 illustrates a projector 13' having a cylindrical slide tray or drum 14' having a plurality of slides therein. Mounted on the projector 13' is a conventional push solenoid 103 mounted above the "selector" button on the projector. The solenoid 103 is connected to the terminal 102 (FIG. 5) for projector return. When the solenoid depresses the selector on a conventional slide projector such as a Kodak Carousel Model E, the shutter closes in front of the light, a mechanical finger (not shown) within the projector lifts the slide out of the gate, and the slide tray 14' is free to rotate.

A flexible band 104 has one end connected to the slide tray 14' and the other end is attached to a conventional constant tension reel 105 mounted on the projector housing. The constant tension reel 105 pays out band 104 as the projector causes the slide tray to advance during normal forward operation. When the solenoid 103 releases the slide tray so that it is free to rotate, the constant tension reel pulls in the flexible band 104, thereby rotating the tray back to its starting position. A mechanical stop 84 at slide position 0 (FIG. 4) stops the return motion of the tray at the proper spot.

Although the flexible band and constant tension reel 105 provide a convenient way of returning the slide tray to its starting position without exceptional forces, other arrangements will be apparent to one skilled in the art, such as an elastic band, or spring wound part way about the drum as it advances. Such arrangements have advantages and disadvantages in that the force increases as the degree of rotation of the drum increases so that when a large number of slides are used in a survey the forces may become too large to permit drum rotation as actuated by the projector. On the other hand, the forces are less near the end of the travel to prevent damage to the tray when it returns to its starting position. With a constant tension reel the same effect could be obtained by adding a dash pot or other snubber near the end of the tray's return stroke.

When the tray returns under the force of the constant tension reel 105, the cam operated switch 92 is actuated by the stud 93 on the side of the slide tray. This actuation applies power through the diodes 80 to punch the tape at A and H or in any other desired code to indicate the end of the survey. It also activates the counter 79 and further applies a short pulse of power (supplied through switch 33 just before it opens) to the unlatching coil 106 of the latching relay 98. This deactivates the projector return terminal 102 and again permits operation of the tape punch 46.

The cam operated switch 94 which is actuated by the stud 96 on the drum is also connected to the latching coil 97 of the latching relay 98. Thus, when the slide tray advances to the first position beyond the last slide in the survey, the switch 94 is actuated thereby latching the relay 98 and causing the projector to return to its first or initial position ready for another survey to commence. It will be noted that since the return stud 96 can be placed at any position about the periphery of the slide tray that a survey of any arbitrary length can be conducted merely by relocating the stud 96 and providing an appropriate number of slides. Since the slide tray 14' returns to its starting position under the impetus of the tension reel at the end of a survey, it is not necessary to fill the entire slide tray with slides, and thereby the cost of duplicating all of the slides in a survey in sufficient number to fill the tray is avoided. As an alternate to the mechanism illustrated in FIG. 6 using a spring and solenoid release, the latching relay 93 can be connected to the automatic reverse mechanism of the projector to "quick step" the projector back to its starting position. Other return arrangements would be used for a film strip projector.

Although limited embodiments of opinion sampling apparatus constructed according to principles of this invention have been described and illustrated in detail, many modifications and variations will be apparent to one skilled in the art. Some of these modifications and variations have been mentioned in the description and others are apparent, such as for example, to use a linear slide tray and return it to the beginning slide position by an elastic member. The logic circuitry has been shown implemented by relays and switches, however, solid state circuitry can be used as desired. Since other variations will be apparent, it is to be understood that within the scope of the appended claims the invention may be practiced otherwise than as specifically described.

What is claimed is:

1. A method of obtaining anonymous data from a public sample comprising the steps of:
   displaying an invitation to submit data in a public place;
   displaying an inquiry soliciting data in response to a person offering to submit data;
   recording an answer to the inquiry without identification of the person answering; and
   displaying the next subsequent inquiry in a preselected sequence as soon as an answer is given, irrespective of the answer given any preceding inquiry.

2. A method of obtaining a data sample as defined in claim 1 wherein the displaying steps each comprise projecting an image on a translucent screen and wherein the recording step comprises recording electrical signals from viewer operated push buttons, onto a recording medium.

3. A method of obtaining anonymous data from a public sample comprising the steps of:
   displaying an invitation to submit data in a public place;
   displaying an inquiry soliciting data in response to a person offering to submit data;
   recording an answer to the inquiry without identification of the person answering;
   displaying the next subsequent inquiry in a preselected sequence as soon as an answer is given, irrespective of the answer given any preceding inquiry; and
   recycling to an initial state if no answer is given to an inquiry in a selected time interval.

4. An opinion or personal data sampling apparatus comprising:
   a front console;
   means for displaying a multiple choice inquiry on the console;
   means for indicating an answer to the inquiry on the console;
   means for recording the answer given;
   means for advancing to a subsequent inquiry when an answer is given to a displayed inquiry; and
   means for recycling to the first inquiry in a series when an intent to cease indicating answers is sensed after any inquiry.

5. A sampling apparatus as defined in claim 4 wherein the means for displaying comprises:
   a translucent screen;
   means for projecting an image on the screen from the back side; and
   means for progressing from one image to the next image, irrespective of the answer to any previous inquiry.

6. A sampling apparatus as defined in claim 5 wherein the means for projecting comprises an automatic slide projector and a magazine of slides; and wherein
   the means for progressing comprises means for actuating the slide projector in response to the means for indicating an answer.

7. A sampling apparatus as defined in claim 6 wherein the means for recycling comprises means for moving the slide magazine to the first slide in a sequence.

8. A sampling apparatus as defined in claim 7 wherein the slide magazine is circular and the means for moving comprises means for releasing the magazine for free rotation; and
   elastic means for returning the magazine to the starting position.

9. A sampling apparatus as defined in claim 4 wherein the means for indicating an answer comprises a plurality of push buttons and the means for recording comprises means for perforating a tape or card in a pattern corresponding to the answers given.

10. A sampling apparatus as defined in claim 4 wherein the means for recycling comprises means for detecting a time interval and means for recycling after a selected time interval during which no answer is given.

11. An opinion or personal data sampling apparatus or the like comprising:
    a console;
    means for displaying a multiple choice inquiry on the console;
    means for indicating an answer to the inquiry on the console;
    means for recording the answer given;
    means for advancing to a subsequent inquiry in a predetermined sequence of inquiries when an answer is given, irrespective of the answer given to any previous inquiry; and
    means for recycling to the beginning of the predetermined sequence after a selected time interval during which no answer is given to any inquiry in the sequence.

12. A sampling apparatus as defined in claim 11 wherein the means for recycling comprises means for advancing through the sequence rapidly to the beginning of a new sequence.

13. A sampling apparatus as defined in claim 11 wherein the means for recycling comprises means for reversing the means for displaying for returning to the beginning.

14. A sampling apparatus as defined in claim 11 wherein the means for recording an answer includes a recorder for an audible answer.

15. A sampling apparatus as defined in claim 11 further comprising means for photographing a person answering an inquiry.

16. Apparatus for sampling opinions, personal data or the like comprising:
  means for projecting a repetitive cyclic sequence of visual images on a screen for a selected time interval;
  means for a viewer to record a multiple choice personal response to each image;
  means for advancing to the next image in the sequence as soon as a personal response is recorded;
  means for recording the responses in correlation with the visual images; and
  means for returning to the beginning of the cycle when no response is received from a viewer in the selected time interval.

17. A sampling apparatus as defined in claim 16 further comprising means for correlating the beginning of a cycle of recorded responses with the beginning of a cycle of visual images.

18. In an opinion sampling apparatus or the like having a slide projector for displaying a sequence of images an improved sequencing combination comprising:
  a plurality of answer push buttons for receiving an answer to an inquiry;
  means for recording in an individual data location which of the plurality of answer push buttons is actuated;
  means responsive to actuation of any answer push button for initiating change of the displayed inquiry, comprising a relay momentarily closable for effecting projector advance;
  means responsive to the change of inquiry for advancing the means for recording to a new data location; and
  a switch responsive to projector advance for signalling beginning of a survey to the means for recording.

* * * * *